(12) United States Patent
Piekarski

(10) Patent No.: US 10,156,990 B2
(45) Date of Patent: Dec. 18, 2018

(54) DATA STORAGE MANAGEMENT

(71) Applicant: MICRON TECHNOLOGY, INC., Boise, ID (US)

(72) Inventor: Marek Piekarski, Macclesfield (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/873,615

(22) Filed: Jan. 17, 2018

(65) Prior Publication Data
US 2018/0143765 A1 May 24, 2018

Related U.S. Application Data

(62) Division of application No. 13/969,402, filed on Aug. 16, 2013.

(51) Int. Cl.
*G06F 3/06* (2006.01)

(52) U.S. Cl.
CPC ............ *G06F 3/0604* (2013.01); *G06F 3/061* (2013.01); *G06F 3/067* (2013.01); *G06F 3/0644* (2013.01); *G06F 3/0665* (2013.01); *G06F 3/0667* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,953,773 B2 * | 5/2011 | Lindholm | G06F 12/0269 707/817 |
| 8,090,899 B1 | 1/2012 | Syu | |
| 9,354,907 B1 | 5/2016 | Teli et al. | |
| 2002/0144070 A1 * | 10/2002 | Watanabe | G06F 3/0617 711/165 |
| 2003/0041211 A1 | 2/2003 | Merkey et al. | |
| 2003/0041220 A1 * | 2/2003 | Peleska | G05B 19/0428 711/162 |
| 2005/0141312 A1 | 6/2005 | Sinclair et al. | |
| 2008/0059747 A1 * | 3/2008 | Burckart | G06F 12/0253 711/167 |
| 2008/0098159 A1 | 4/2008 | Song et al. | |
| 2008/0104355 A1 * | 5/2008 | Moore | G06F 3/0607 711/170 |
| 2008/0320213 A1 | 12/2008 | Kinoshita | |
| 2009/0259800 A1 | 10/2009 | Kilzer et al. | |
| 2009/0268738 A1 | 10/2009 | Tchapda | |

(Continued)

*Primary Examiner* — Ramon A. Mercado
(74) *Attorney, Agent, or Firm* — Dorsey & Whitney LLP

(57) ABSTRACT

A method of managing a plurality of storage devices. The method comprises at a first device connected to the plurality of storage devices via a switch, receiving an indication of a plurality of logical disks, each logical disk being provided by a respective one of the plurality of storage devices. Each logical disk comprises a plurality of logical blocks. Data representing a virtual disk is generated, the virtual disk comprising a plurality of virtual blocks, each virtual block being provided by a logical block. Access is provided to the virtual disk to a second device different to the first device. A first virtual block is selected, the first virtual block being provided by a first logical block, and a re-mapping operation is performed after which the first virtual block is provided by a second logical block different to the first logical block.

15 Claims, 10 Drawing Sheets

(56) References Cited

U.S. PATENT DOCUMENTS

| | | | |
|---|---|---|---|
| 2009/0307388 A1* | 12/2009 | Tchapda | G06F 13/4022 710/33 |
| 2009/0319255 A1* | 12/2009 | Vengerov | G06F 12/0253 703/22 |
| 2009/0319720 A1* | 12/2009 | Stefanus | G06F 12/0246 711/103 |
| 2010/0017555 A1 | 1/2010 | Chang et al. | |
| 2011/0055455 A1* | 3/2011 | Post | G06F 12/0246 711/103 |
| 2011/0055458 A1* | 3/2011 | Kuehne | G06F 12/0246 711/103 |
| 2011/0145490 A1* | 6/2011 | Lee | G06F 12/0246 711/103 |
| 2011/0197039 A1* | 8/2011 | Green | G06F 3/0617 711/162 |
| 2011/0238890 A1 | 9/2011 | Sukegawa | |
| 2011/0264880 A1 | 9/2011 | Ylonen | |
| 2011/0320685 A1* | 12/2011 | Gorobets | G06F 12/0246 711/103 |
| 2012/0151124 A1* | 6/2012 | Baek | G06F 12/0246 711/103 |
| 2013/0046920 A1* | 2/2013 | Ryu | G06F 12/0246 711/103 |
| 2014/0173186 A1* | 6/2014 | Randall | G06F 12/0866 711/103 |
| 2015/0007172 A1* | 1/2015 | Hudzia | G06F 9/45533 718/1 |

\* cited by examiner

DATA STORAGE MANAGEMENT

CROSS-REFERENCE TO RELATED APPLICATION

This application is a divisional of U.S. patent application Ser. No. 13/969,402, filed Aug. 16, 2013, issued as U.S. patent Ser. No. 10/007,428 on Jun. 26, 2018. The aforementioned application and patent are incorporated by reference herein, in their entirety, and for all purposes.

TECHNICAL FIELD

The present invention relates to methods, systems and devices for managing data stored at a plurality of storage devices.

The rate at which data is generated, collected and stored has increased, and continues to increase, dramatically with the proliferation of computing devices. Data generation and storage for professional, academic and personal uses have all seen sharp increases, particularly within the last decade. The requirements for reliable and robust data storage mechanisms is therefore of broad interest.

Solid state storage devices such as those that use Flash memory are known to provide a number of advantages over other storage technologies such as hard drives and tape drives. For example, an absence of moving parts means that solid state storage devices are often less susceptible to physical shock, are quieter in operation, have lower access times and lower latencies.

Solid state storage devices do suffer from drawbacks, however. Many solid state storage technologies suffer from limited write endurance. For example Flash memory in particular comprises individually erasable blocks that can each be subjected to a maximum number of erasures before failure. Data must be erased from a block before that block can be written to.

Solid state drives (SSDs) containing Flash memory may perform "wear levelling" to try to distribute erasure and re-write operations evenly across the blocks of a Flash memory. In this way, failure of the SSD as a result of a small number of blocks being subject to a disproportionate number of erasure or write operations, can be avoided.

A plurality of SSDs may be packaged into an appliance, allowing particular SSDs to be removed and to be replaced by new SSDs. Improved methods of managing erasure and write operations across SSDs within an appliance is desired. Furthermore, appliances are generally limited by the number of SSDs that can be contained within the appliance. More generally, therefore, methods for improving storage systems are desired.

DETAILED DESCRIPTION

Figure 1:
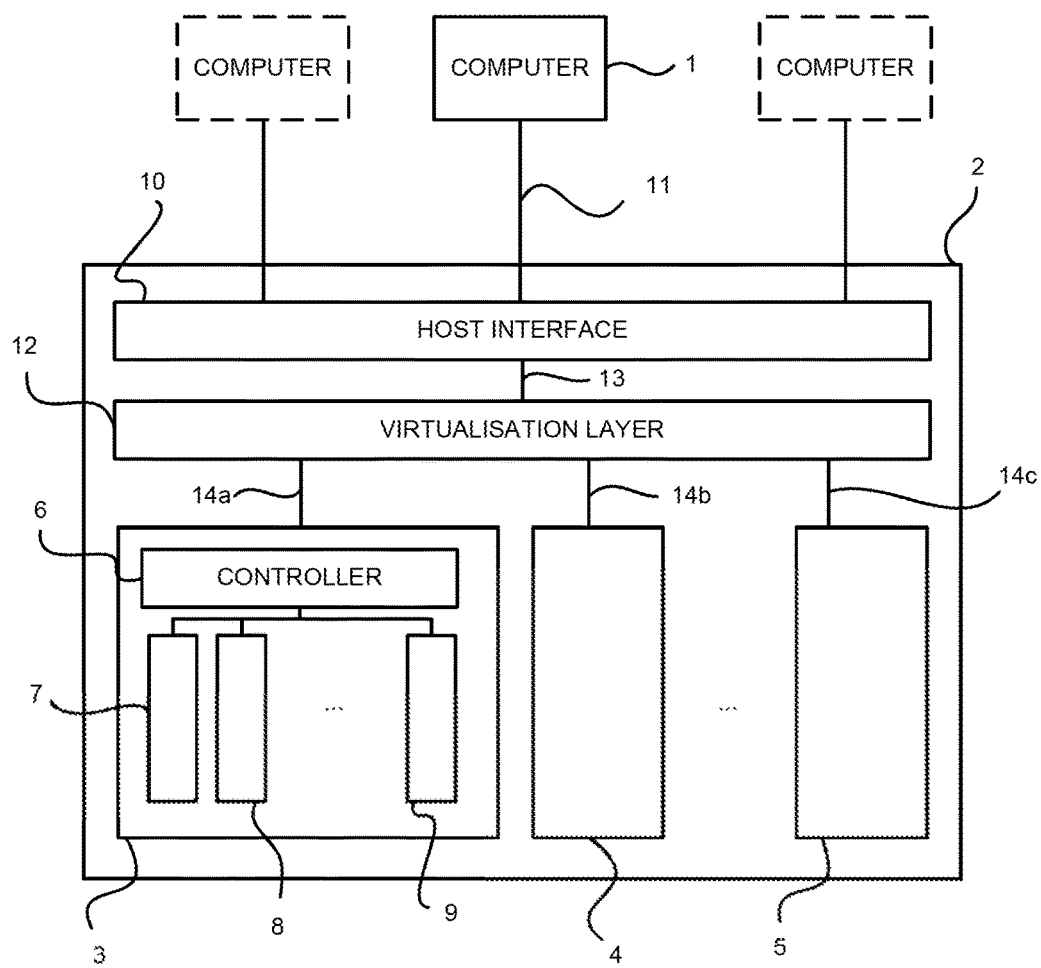
FIG. 1 is schematic illustration showing a configuration in which a storage appliance connects to a computer.

FIG. 1 schematically illustrates one way in which a computer can access storage provided by a plurality of solid state memories. In FIG. 1, a computer 1 is directly connected to an SSD storage appliance 2. The SSD storage appliance 2 comprises a plurality of solid state drives (SSDs). Three SSDs 3, 4, 5 are shown in FIG. 1, though it will be appreciated that the appliance 2 may comprise any number of SSDs. The SSD 3 is shown in further detail. It can be seen that the SSD 3 comprises an SSD controller 6 and a plurality of solid state memories. Three solid state memories 7, 8, 9 are shown in FIG. 1, though it will be appreciated that the SSD 3 may comprise any number of solid state memories. The solid state memories 7, 8, 9 are Flash memories, though it will be appreciated that one or more of the solid state memories may be any type of solid state memory, such as EEPROM memories more generally.

The SSD controller 6 is configured to control the way in which data is written to the solid state memories 7, 8, 9 by abstracting the details of how data is stored on the solid state memories 7, 8, 9 to users of the SSD 3. In the present example, the SSD controller 6 is operable to provide what will be referred to as a "logical disk" representing the physical storage provided by the solid state memories 7, 8, 9. It will be appreciated that in other embodiments, any number of logical disks may be provided by the controller 6. The SSD controller 6 receives read/write requests specifying an address in the logical disk and directs those requests to locations within the solid state memories 7, 8, 9. The SSD controller 6 may perform wear-levelling across the solid state memories 7, 8, 9, and between pages (i.e. minimum erasable address ranges) within each solid state memory 7, 8, 9.

While the examples described herein are described in terms of "storage" and "disks", it will be appreciated that the concepts described are equally applicable to other data access semantics. For example, it will be appreciated from the teaching herein that the techniques described are equally applicable to "memory" and "address space" data access semantics. While "storage" access semantics generally use read/write requests to set up asynchronous transfers of, typically, relatively large amounts (e.g. kilobytes or megabytes) of data, "memory" access semantics generally involve synchronous reads/writes of relatively small (e.g. 64 bytes) amounts of data.

In the appliance 2 the SSDs 4, 5 are arranged in the same way as the SSD 3, and each provides a respective single logical disk. It is to be understood, however, that the SSDs 3, 4, 5 may each be configured differently. For example, each SSD within the appliance 2 may have a different storage capacity, use different solid state memories, use different SSD controllers, etc.

Figure 2:
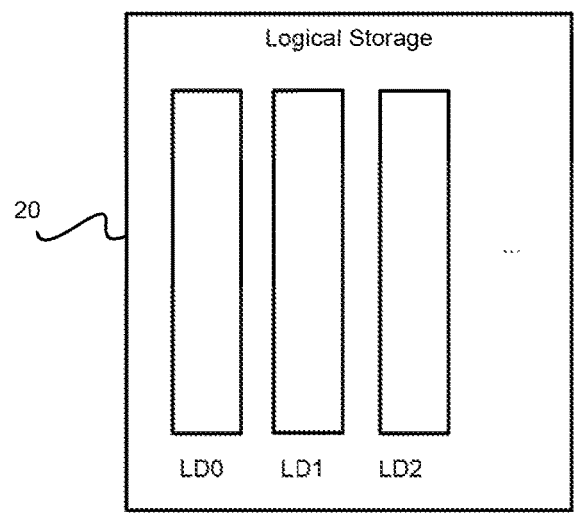
FIG. 2 is a schematic illustration showing logical storage resources provided by a solid state storage drive (SSD) of the storage appliance of FIG. 1.

Referring to FIG. 2, there is schematically illustrated a logical storage space 20 provided by the SSDs 3, 4, 5. The logical storage space 20 comprises three logical disks each provided by a respective one of the SSDs 3, 4, 5. In particular, a first logical disk LD0 is provided by the SSD 3, a second logical disk LD1 is provided by the SSD 4 and a third logical disk LD2 is provided by the SSD 5. As indicated above, while in this example each of the SSDs 3, 4, 5 are similarly arranged to provide logical disks of the same size, it is to be understood that this is not an essential feature.

The appliance 2 further comprises a host interface layer 10 for facilitating communication between the computer 1 and the appliance 2 over an interface 11. The interface 11 is a PCI Express interface, though it is to be understood that the interface 11 (and therefore the host interface layer 10) may utilise any interface technology. For example, in other embodiments, the interface 11 may be Ethernet, Fibre Channel, Inifiniband, etc. The appliance 2 is shown connected to the computer 1, though the appliance host interface layer 10 may provide a fan-out function allowing connection to a plurality of computers, illustrated in FIG. 1 by two additional computers depicted in dashed outline and connecting directly to the host interface 10.

A virtualisation layer 12 connects to the host interface 10 via an interface 13. The virtualisation layer 12 connects to each SSDs 3, 4, 5 via respective interfaces 14a, 14b, 14c. It is assumed for the purposes of the present example that the interfaces 11, 13 and 14a-c are PCI Express interfaces such that no conversion is performed by the virtualisation layer 12 to convert between the interfaces 14a-c and 13. It is to be understood, however, that the consistency of interface used within the adapter 2 is not an essential feature. Indeed, each of the interfaces 11, 13, 14a-c may be different. As further examples, the interfaces 14a-c may be SAS or SATA interfaces.

The virtualisation layer 12 is configured to provide an abstraction of the logical storage provided by the SSDs 3, 4, 5. In particular, the virtualisation layer 12 is configured to create a plurality of what will be referred to herein as "virtual disks", and to provide access to the virtual disks to the computer 1 (and other computers connected to the appliance 2). To create the virtual disks, the virtualisation layer 12 is configured to split the logical storage provided by the SSDs 3, 4, 5 into a plurality of equally sized blocks. When the appliance 2 is requested to create a virtual disk by the computer 1, the virtualisation layer 12 creates the storage associated with that virtual disk as a series of virtual blocks, each virtual block being the same size as a logical block. A mapping is then created between each block of the newly created virtual disk and the logical block that is to provide the storage for that virtual block. The virtualisation layer 12 can therefore create virtual disks with capacities ranging from a single logical block to the entire capacity of the logical storage 20.

Figure 3:
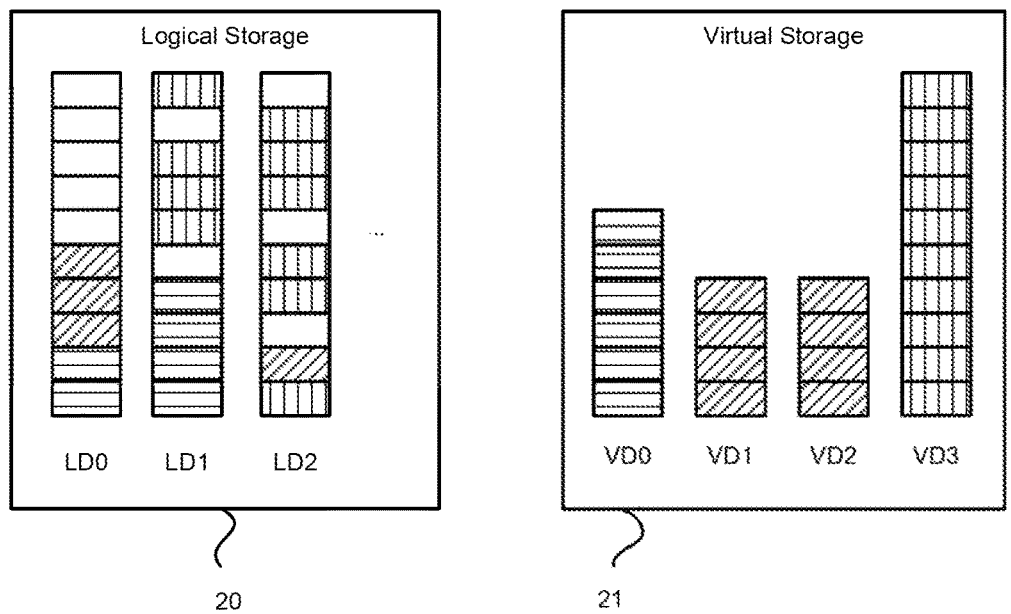
FIG. 3 is a schematic illustration showing a mapping between logical storage resources and virtual storage resources provided by the appliance of FIG. 1.

Referring to FIG. 3, the logical disks LD0, LD1 and LD2 have been split to each provide ten logical blocks. Four virtual disks are provided in a virtual storage space 21. A virtual disk VD0 comprises six virtual blocks, two virtual disks VD1, VD2 each comprises four virtual blocks and a virtual disk VD3 comprises ten virtual blocks. Shading of the blocks of the virtual disks VD0-VD3 and the blocks of the logical disks LD0-LD2 indicates, generally, which logical blocks provide storage for the blocks of the virtual disks.

In FIG. 3, each block of the virtual disk VD0 is filled with horizontal line shading, each block of the virtual disks VD1 and VD2 is filled with diagonal line shading, while each block of the virtual disk VD3 is filed with vertical line shading. Two blocks from the logical disk LD0, and four blocks from the logical disk LD1 are filled with horizontal line shading indicating that these blocks provide the storage for the virtual disk VD0. Three blocks of the logical disk LD0 and one block of the logical disk LD2 are filed with diagonal line shading indicating that these blocks provide the storage for both of the virtual disks VD1, VD2. Four blocks of the logical disk LD1 and six blocks of the logical disk LD2 are filled with vertical line shading indicating that these blocks provide the storage for the virtual disk VD3. Each of the Tables 1 to 4 below show a mapping table for a particular one of the virtual disks, VD0 to VD3. The mapping tables shown in Tables 1 to 4 may be stored and maintained by the virtualisation layer 12.

TABLE 1

Mapping table for virtual disk VD0

| Virtual Disk:Block | Logical Disk:Block |
|---|---|
| VD0:0 | LD0:0 |
| VD0:1 | LD0:1 |
| VD0:2 | LD1:0 |
| VD0:3 | LD1:1 |
| VD0:4 | LD1:2 |
| VD0:5 | LD1:3 |

TABLE 2

Mapping table for virtual disk VD1

| Virtual Disk:Block | Logical Disk:Block |
|---|---|
| VD1:0 | LD0:2 |
| VD1:1 | LD0:3 |
| VD1:2 | LD0:4 |
| VD1:3 | LD2:1 |

TABLE 3

Mapping table for virtual disk VD2

| Virtual Disk:Block | Logical Disk:Block |
|---|---|
| VD2:0 | LD0:2 |
| VD2:1 | LD0:3 |
| VD2:2 | LD0:4 |
| VD2:3 | LD2:1 |

TABLE 4

Mapping table for virtual disk VD3

| Virtual Disk Block | Logical Disk:Block |
|---|---|
| VD3:0 | LD1:5 |
| VD3:1 | LD1:6 |
| VD3:2 | LD1:7 |
| VD3:3 | LD1:9 |
| VD3:4 | LD2:0 |
| VD3:5 | LD2:3 |
| VD3:6 | LD2:4 |
| VD3:7 | LD2:6 |
| VD3:8 | LD2:7 |
| VD3:9 | LD2:8 |

With reference to the Tables 2, 3 it can be seen that the virtual disks VD1 and VD2 are provided by the same logical blocks, and that the mappings between those logical blocks and the virtual blocks of the virtual disks VD1 and VD2 are also the same. That is, both the virtual blocks VD1:0 and VD2:0 map to the same logical block (LD0:2), both virtual blocks VD1:1, VD2:1 map to the same logical block (LD0:3), etc. It is to be understood however, that a mapping between virtual blocks of two virtual disks provided by the same logical blocks need not be identical. For example, the virtual blocks VD1:1, VD2:1 may be mapped to different ones of the logical blocks providing the virtual disks VD1, VD2 (LD000:2, LD0:3, LD0:4, LD2:1).

Upon receipt of a read/write request from the computer 1 specifying one or more virtual blocks of a particular virtual disk, the virtualisation layer 12 determines the corresponding logical block(s) that provides the storage for the specified virtual block(s). The virtualisation layer 12 then provides the read/write request to the SSD controller of the appropriate SSD 3, 4, 5 which handles the operation of the read/write request with respect to the underlying physical storage provided by the solid state memories of the SSD.

A read/write request may comprise a sequential, contiguous block of addresses. For example, a read/write request may be defined by a 'start address' and a 'length'. Such read/write requests may therefore span a plurality of virtual blocks. It will be appreciated from the above that the plurality of virtual blocks specified in a read/write request may each be mapped to logical blocks provided by the same logical disk but which are not contiguous, or may each be mapped to logical blocks provided by different logical disks. In such cases, the read/write requests may be split into a plurality of read/write requests at the "boundary" of each virtual block. That is, if, for example, a read/write request specifies an address range that spans three virtual blocks mapped to three non-contiguous logical blocks (either within the same logical disk or different logical disks), the read/write request may be split into three separate read/write requests. Such splitting may be performed by the virtualisation layer 12. While a read/write request may specify a plurality of virtual blocks, for clarity of description herein it is assumed that each read/write request indicates a single virtual block.

The mapping between logical blocks of the logical storage space 20 and the virtual blocks of the virtual storage space 21 shown in FIG. 3 is merely exemplary. Indeed, the mapping may take any form. That is, any virtual block may be mapped to any one of the logical blocks, and, as shown in FIG. 3, the mapping may be a many-to-one mapping such that many virtual blocks may be mapped to a single physical block.

Wear on an SSD is primarily determined by the number and the characteristics of erasure and write operations performed on that SSD. As noted above, each SSD controller (such as the controller 6 of the SSD 3) may perform wear levelling to ensure that wear is levelled across the solid state memories (such as the solid state memories 7, 8, 9) within the SSD. However, while the controller 6 may spread erasure and write operations across the solid state memories 7, 8, 9 within the SSD 3 (and between pages of a particular solid state memory), if for example, one or more logical blocks within the virtual disk VD1 that are mapped to blocks of the logical disk LD0 are particularly heavily written to by the computer 1, the logical disk LD0 (and therefore the SSD 3) may experience heavy wear in comparison to the other logical disks LD1 to LD2 (and therefore the SSDs 4, 5). Such concentration of wear on a single SSD may be undesirable.

Because the virtualisation layer 12 is responsible for the mapping between logical blocks and virtual blocks, the individual SSD controllers of the SSDs 3, 4, 5 are unable to control which SSD data is written to in response to use of a particular virtual block by the computer 1. The virtualisation layer 12 is therefore configured to manage wear across the SSDs 3, 4, 5 according to a desired wear policy.

Figure 4:
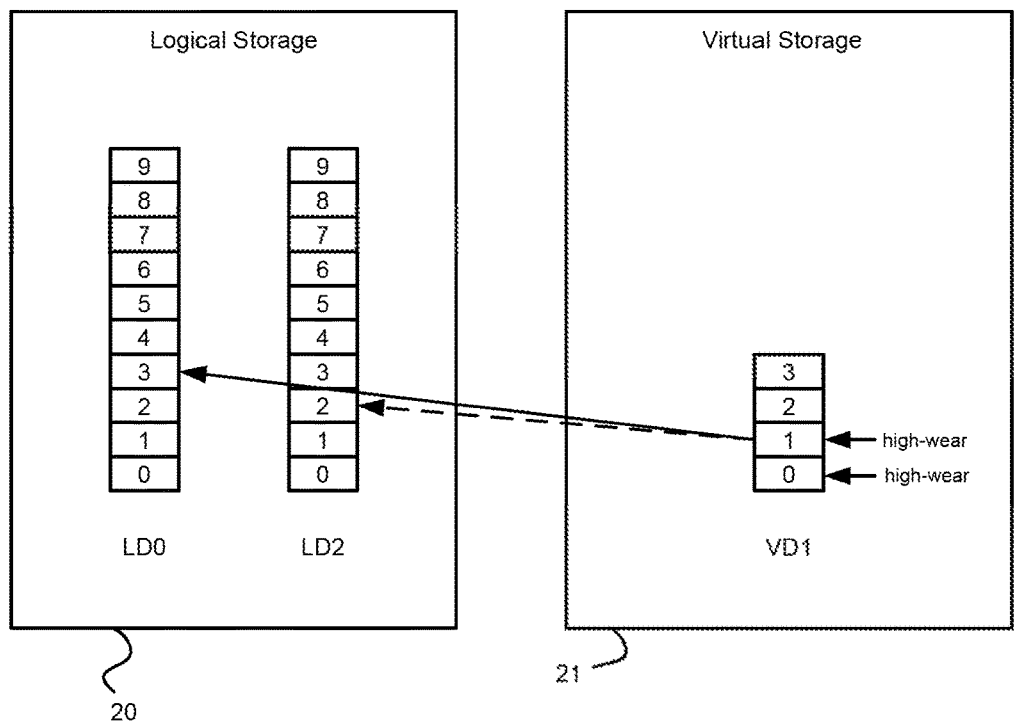
FIG. 4 is a schematic illustration of a re-mapping operation between a virtual storage unit and a logical storage unit to another logical storage unit.

Referring to FIG. 4, the virtual disk VD1 and the logical disks LD0. LD2 are shown. As indicated in the Table 2 above, the virtual block VD1:0 is mapped to the logical block LD0:2, while the virtual block VD1:1 is mapped to the logical block LD0:3. Both the virtual block VD1:0 and the virtual block VD1:1 are high-wear blocks (i.e. the virtual blocks VD1:0 and VD1:1 have a greater contribution to the overall wear of the SSDs to which they are currently mapped). That is, in the example of FIG. 4, the virtual blocks VD1:0 and VD1:1 contribute more to wear on the SSD 3 than does the virtual block VD1:2.

The determination as to which virtual blocks are high-wear blocks may be based upon an amount of data that is written to those virtual blocks. The virtualisation layer 12 may track the amount of data that is written per virtual block and use this as an indication of the contribution of that block to SSD wear. The virtualisation layer 12 may utilise other information in determining whether a particular virtual block is a high-wear block. For example, the virtualisation layer 12 may query the SSD controller of each SSD with regard to the way in which SSD wear levelling is performed by that controller. Alternatively or additionally, the virtualisation layer 12 may utilise an approximation of the wear levelling algorithm performed by one or more of the SSD controllers to estimate how a write to a particular block affects the wear on an SSD controlled by that controller.

Further, performing many frequent small writes can cause more wear than writing the same amount of data in fewer large writes. As such, the virtualisation layer 12 may also track and utilise data indicating the size distribution of write operations. Additionally, misaligned writes may cause more wear than writes aligned with word boundaries. As such, the virtualisation layer 12 may utilise data indicating the alignment of writes relative to the architectural boundaries of an SSD. In general, it will be appreciated that any appropriate data may be used by the virtualisation layer 12 in determining whether a block constitutes a high-wear block.

Having determined that a virtual block is a high-wear block, this information is used to implement a particular wear policy. For example, a wear-levelling policy may be implemented in which the virtualisation layer updates the mapping between logical storage 20 and physical storage 21 in order to equally spread any high-wear blocks across the SSDs 3, 4, 5. A wear-levelling policy can help ensure that each SSD 3, 4, 5 wears evenly such that each SSD 3, 4, 5 fails near to the same time. As another example, a wear-concentration policy may be implemented in which the virtualisation layer 12 concentrates high-wear blocks on relatively few SSDs or a single SSD. In this way, one or more SSDs can be caused to wear out before other SSDs in the appliance 2 so that not all SSDs within the appliance 2 fail at the same time. Where two or more SSDs use different technology such that at least one SSD has a greater endurance than the other SSDs (i.e. can perform a larger number of erasures and writes per block before failure of that block), the virtualisation layer 12 can concentrate high-wear blocks onto those SSDs with a greater endurance.

It is to be understood that other wear policies or any combination of wear policies may be used.

The contribution that any particular block makes to the wear on an SSD may change with time. The virtualisation layer 12 is therefore arranged to update the mapping between the logical address space 20 and the virtual address space 21. Referring again to FIG. 4, a solid arrow from the virtual block VD1:1 to the logical block LD0:3 indicates the current mapping between the virtual block VD1:1 and the logical block LD0:3. A dashed arrow from the virtual block VD1:1 indicates a new mapping between the virtual block VD1:1 and a logical block LD2:2. Table 5 below illustrates the state of the mapping table for the virtual disk VD1 after the re-mapping illustrated in FIG. 4. After the mapping change, each of the logical disks LD0 and LD2 comprise a single high-wear block. The re-mapping shown in FIG. 4 may therefore be considered to be an example of a wear-levelling policy.

TABLE 5

Updated mapping table for virtual disk VD1

| Virtual Disk:Block | Logical Disk:Block |
|---|---|
| VD1:0 | LD0:2 |
| VD1:1 | LD2:2 |
| VD1:2 | LD0:4 |
| VD1:3 | LD2:1 |

In order to change the mapping between the virtual block VD1:1 and the logical block LD0:3 so that the virtual block VD1:1 is mapped to the logical block LD2:2, the data stored within the logical block LD0:3 is copied to the logical block LD2:2. Depending upon the size of the blocks, this may take a significantly long time compared to the rate at which data is written to and read from the appliance 2 by the computer 1. Generally, read activity can continue to be directed to the logical block LD0:3 until the copy operation is complete and the mapping has been updated. Write activity may be handled as described in the examples below with reference to FIGS. 5 to 9 to mitigate problems that may be caused when data is written to a virtual block that is currently undergoing a re-mapping operation.

Where a mapping between logical blocks and the virtual blocks of the virtual disk VD2 is to be maintained as identical to the mapping between logical blocks and the virtual blocks of the virtual disk VD1 (as shown in Tables 2, 3), the mapping table for the virtual disk VD2 may also be updated following the re-mapping operation for the virtual disk VD1.

It is to be understood that a "re-mapping operation" for a particular virtual block of a particular virtual disk generally involves copying data from a logical block to which the particular virtual block is currently mapped to a new logical block, ensuring that the new logical block is correct (taking account of any intervening write operations), and updating the mapping table for the particular virtual disk so that the particular virtual block is mapped to the new logical block.

Re-mapping operations may need to be performed under different conditions. For example, it may be possible to "stall" the whole of the appliance 2, or only the current logical block, to prevent write operations to the current logical block for a long enough time to allow a re-mapping operation to be effected without detrimental delay to computers wishing to use the appliance 2. In other examples, however, stalling of the appliance 2 or the current logical block is either not desirable, or infeasible. In examples where stalling of the appliance 2 for an entire mapping update is not desired or infeasible, mapping updates are executed while the appliance 2 is fully functioning ("live"). That is, in some examples, mapping updates are executed while computers are reading and writing data to/from the virtual disks provided by the appliance 2.

In general terms, and as described in more detail below with reference to FIG. 6, in one example copy operation, a current logical block is sub-divided into a plurality of sub-blocks. The number of sub-blocks may be selected based on any appropriate criteria. As an example, the current block may be sub-divided into one-thousand-twenty-four sub-blocks. Data is then copied from the current logical block to the new logical block one sub-block at a time. It is to be understood that the sub-division of a logical block into a plurality of sub-blocks need not require any processing to be carried out on the logical block itself. Rather, the sub-division is a logical sub-division from the point of view of the virtualisation layer 12.

As the virtual block represents a mapping between a view of storage visible to the computer 1 and the logical storage provided by the SSDs, concepts described with respect to a virtual block may be considered to apply equally to the logical block to which it is mapped. For example, in considering the sub-division of a logical block, any virtual block to which that logical block is mapped may be considered to be so sub-divided. Similarly, when it is described herein that a virtual block is the subject of a re-mapping operation, it may of course equally be said that the logical block to which the virtual block is mapped is subject to the same re-mapping operation.

Figure 5:
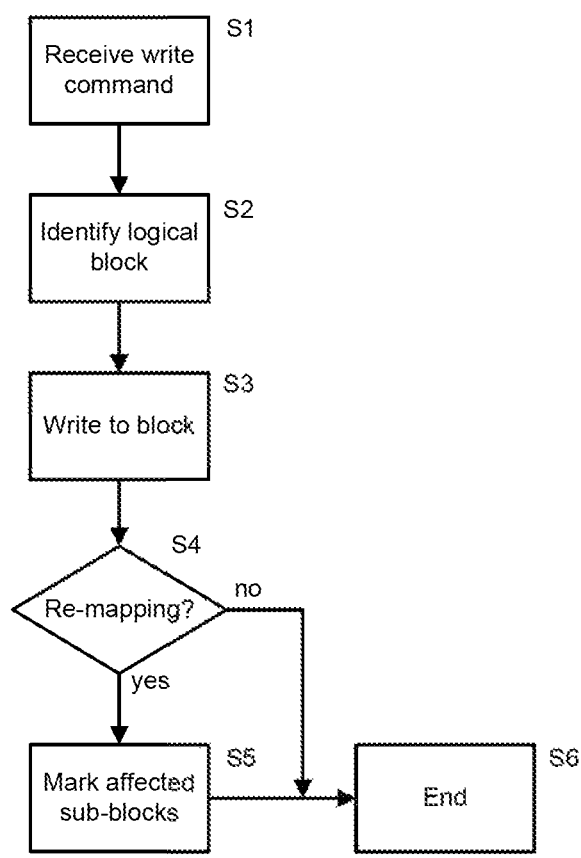
FIG. 5 is a flowchart showing processing carried out to perform a write operation.

Referring to FIG. 5, there is illustrated processing that may be carried out by the appliance 2 in response to receipt of a write request. At a step S1 a write request is received (e.g. from the computer 1) comprising data and an address of a virtual block to which the data is to be written. At a step S2 the virtualisation layer 12 determines the logical block to which virtual block specified in the write request corresponds. Processing passes to step S3 at which the received data is written to the identified logical block (i.e. is sent to the SSD that provides the logical block for writing to a solid state memory in accordance with the policies of the SSD controller).

From step S3, processing passes to step S4 at which it is determined whether a re-mapping operation is currently underway that includes the logical block to which data was written at step S3. If it is determined that a re-mapping operation is currently underway, processing passes to step S5 at which any sub-blocks that have been affected by the write operation and which have already been copied to the new logical block are marked as 'dirty'. For example, a flag may be set within a record of each sub-block maintained by the virtualisation layer 12. Processing passes from step S5 to end at step S6. If, on the other hand, it is determined at step S4 that the logical block is not currently the subject of a re-mapping operation, processing passes directly from step S4 to end at step S6.

The processing of FIG. 5 therefore allows a determination to be made as to which sub-blocks of a logical block have been affected by a write request that occurs during a re-mapping operation.

Figure 6:
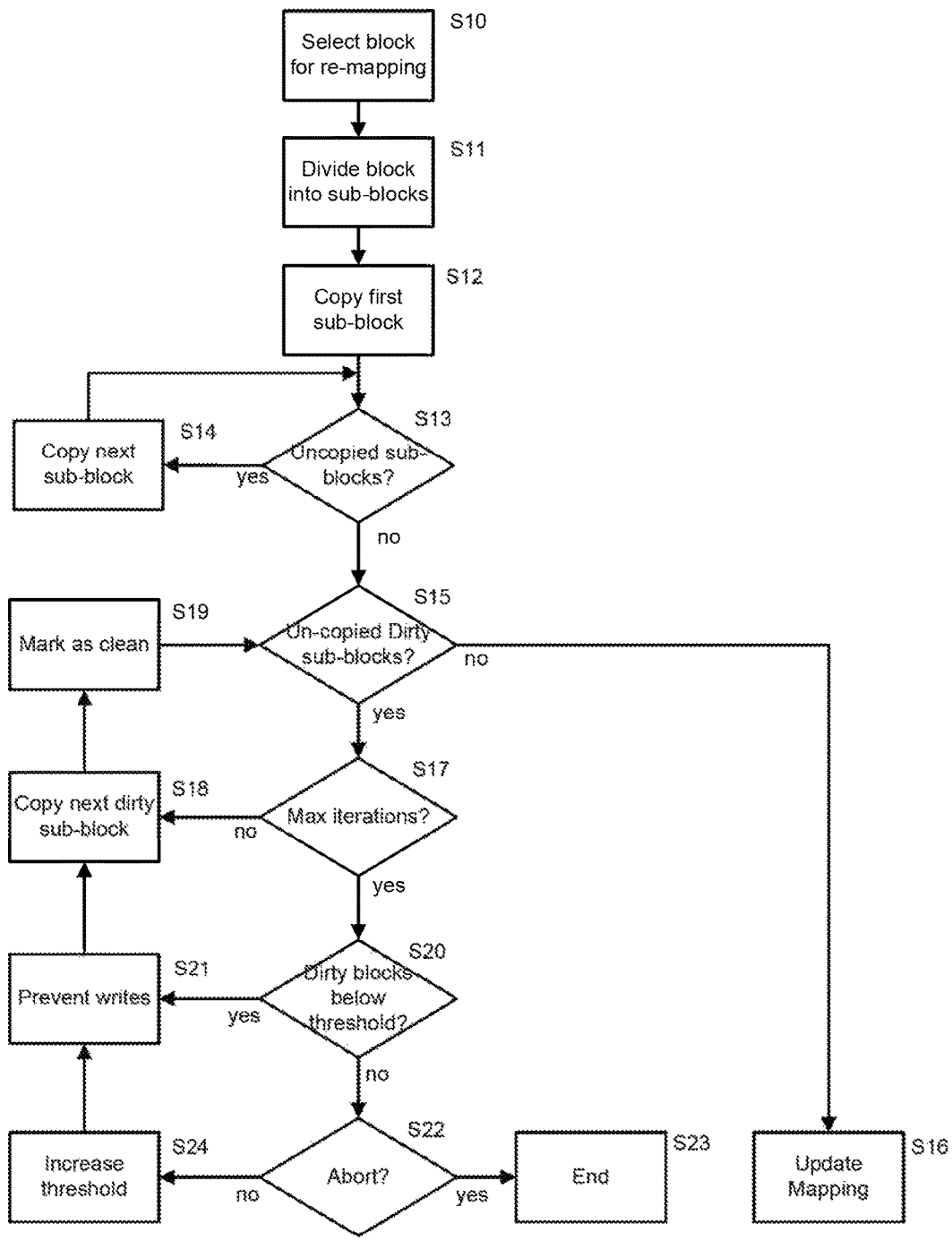
FIG. 6 is a flowchart showing processing carried out to perform a re-mapping operation to change a mapping between virtual storage units and logical storage units.

Referring now to FIG. 6, an example of processing carried out to perform a re-mapping operation is now described. At a step S10, a virtual block to be re-mapped is selected, as discussed above. A new logical block to which the selected virtual block is to be mapped is also selected. An indication is stored that the virtual block is currently subject to a mapping operation (for use at step S4 of FIG. 5).

At step S11 the current logical block and the new logical block are divided into a plurality of sub-blocks. At step S12 the first sub-block of the plurality of sub-blocks is copied to the corresponding sub-block of the new logical block. At step S13 it is determined whether any of the plurality of the sub-blocks remain to be copied to the new logical block. If it is determined at step S13 that there are un-copied sub-blocks, processing passes to step S14 at which the next un-copied sub-block is copied to the new logical block. Processing passes from step S14 to step S13. Processing therefore loops between steps S13 and S14 until each sub-block has been copied to the new logical block.

If it is determined at step S13 that all sub-blocks have been copied to the new logical block, processing passes from step S13 to step S15, at which it is determined whether there are any blocks marked "dirty" (by the processing of step S5 of FIG. 5) that have not been copied. That is, it is determined at step S15 whether, after being copied by the processing of steps S12 to S14, new data has been written to any of the sub-blocks, the new data having yet to be copied to the new logical block. If it is determined at step S15 that there are no un-copied "dirty" sub-blocks, this indicates that the new logical block is correct and processing passes from step S15 to step S16 at which the mapping is updated. After the processing of step S16, therefore, the selected virtual block is mapped to the new logical block and the indication that a re-mapping is underway is cleared.

If, on the other hand, it is determined at step S15 that there are un-coped "dirty" sub-blocks, the new logical block will not be correct, such that the mapping cannot be updated. Processing therefore passes from step S15 to step S17 at which it is determined whether a maximum number of re-copy iterations (steps S15, S17, S18 and S19) has occurred. If it is determined that a maximum number of re-copy iterations has not occurred, processing passes from step S17 to step S18 at which the next "dirty" sub-block is copied to the appropriate sub-block in the new logical block. Processing passes from step S18 to step S19 at which the re-copied block is marked as "clean" (i.e. the dirty flag is cleared) to indicate that the sub-block has been re-copied with the latest written data. Processing passes from step S19 to step S15 at which it is determined whether there are any remaining un-copied dirty sub-blocks.

Processing loops between steps S15, S17, S18 and S19 until either there are no remaining dirty sub-blocks (such that processing ends at step S16) or until it is determined at step S17 that a maximum number of re-copy iterations has been performed. Where the rate at which new data is written to the selected virtual block is lower than the rate at which the data is copied between the old logical block and the new logical block, the re-copy iterations will result in the number of dirty sub-blocks tending towards zero. If, however, the rate at which new data is written to the selected virtual block is near to or exceeds the rate at which data is copied, a substantial number of "dirty" sub-blocks may remain even after many re-copy iterations.

The maximum number of re-copy iterations may be defined by a user of the appliance 2 in dependence upon application specific requirements. For example, the maximum number of Iterations may be selected with regard to an acceptable time in which performance of the appliance 2 may be reduced as a result of the re-copy operation as balanced against a desire to implement the selected wear-policy. For example, a lower number of re-copy iterations may be selected where it is desired to reduce the length of time for which the performance of the appliance 2 is reduced.

If it is determined at step S17 that a maximum number of iterations has been reached, processing passes from step S17 to step S20. At step S20 it is determined whether the number of remaining "dirty" sub-blocks is below a predetermined threshold. If it is determined that the number of "dirty" sub-blocks is below the predetermined threshold, processing passes to step S21 at which further writes to the virtual block are prevented until the re-mapping has completed. Processing passes from step S21 to step S18. During a "writes prevented" state the maximum number of allowed re-copy iterations may be set such that a sufficient number of re-copy iterations complete to allow the remaining dirty sub-blocks to be copied. In other embodiments, step S17 may be ignored while in the "writes prevented" state. In other alternative embodiments, the maximum number of re-copy iterations may be set to a desired number and the processing of step S17 carried out as described above.

The predetermined threshold against which the number of "dirty" sub-blocks is judged at step S20 may be set by a user in dependence upon application specific requirements. For example, the predetermined threshold may be set at a level at which the estimated time to copy the remaining dirty sub-blocks is acceptably short as judged, for example, against application-specific requirements.

If, on the other hand, it is determined at step S20 that the number of dirty sub-blocks is above the predetermined threshold, processing passes to step S22. This situation may arise if, for example, the rate at which new data is being written to the current logical block is higher or equal to the rate at which data is being copied to the new logical block. At step S22 it is determined whether the re-mapping process is to be aborted. If it is determined at step S22 that the re-mapping process is to be aborted, processing passes from step S22 to end at step S23. A message may be provided to a user or administrator of the appliance 2 that the re-mapping process has failed.

If, on the other hand, it is determined at step S22 that the re-mapping process is not to be aborted, processing passes from step S22 to step S24 at which the dirty block threshold of step S20 is increased, and the maximum number of allowed iterations is re-set to a desired quantity. Processing passes from step S24 to step S21 at which writes to the current logical block are prevented.

The processing described above with reference to FIG. 6 provides one example of a way in which a current logical block may be copied to a new logical block. It will be appreciated that modifications to the processing of FIG. 6 may be made. For example, if it is determined that the maximum number of re-copy iterations has been exceeded, and the number of dirty sub-blocks is not below a predetermined threshold, other mitigation strategies may be implemented than those implemented at steps S22 and S24. For example, where possible, instead of preventing writes to the current logical block entirely, the rate at which data is copied to the new logical block may be increased. That is, in some embodiments, the rate at which data is initially copied to the new logical block may be limited in order to prevent the copy process from adversely affecting the normal operation of the appliance 2. Where this is the case, such limitations may be eased or removed in order to allow the copy process to complete.

In other embodiments, rather than determining at step S17 whether a maximum number of re-copy iterations have occurred, the virtualisation layer may track the number of remaining dirty-sub blocks. It may then be determined whether the number of un-copied dirty sub-blocks is reducing in each iteration of steps S15, S17, S18, S19, or over predetermined periods of time.

The processing of FIG. 6 (and the processing of FIG. 8 described below) may be performed in parallel in order to copy multiple blocks at the same time. Such parallel processing may, however decrease the rate at which each copy operation is performed, which may in turn increase the number of dirty sub-blocks which need to be recopied. As such, the number of re-copy operations allowed to execute in parallel may be selected by a user or administrator of the appliance 2 in dependence upon application-specific requirements.

Figure 7:
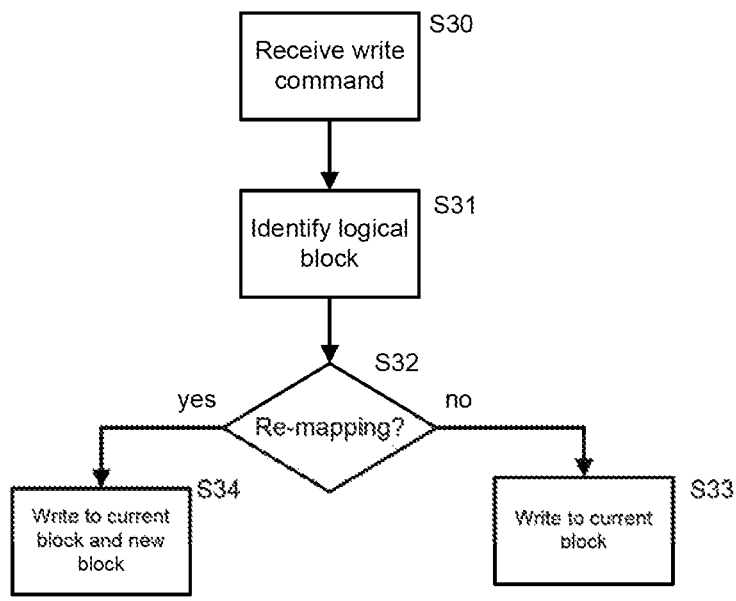
FIG. 7 is a flowchart showing alternative processing carried out to perform a write operation.

An alternative example of a way in which data may be copied between a current logical block and a new logical block is described with reference to FIGS. 7, 8. Referring first to FIG. 7, processing carried out during a data write operation is described. At step S30 a write request s received comprising data and an indication of a virtual block to which the data is to be written. At step S31, the current logical block to which the virtual block is mapped is identified. At step S32 it is determined whether the virtual block identified in the write request and the corresponding logical block are subject to a re-mapping operation. If it is determined that there is no re-mapping operation currently active for the virtual block/logical block, processing passes to step S33 and the data is written to the current logical block. If, on the other hand, it is determined at step S32 that the virtual block/logical block are the subject of a current re-mapping operation, processing passes to step S34 at which the data is written to both the current logical block and the new logical block. That is, two separate write operations are performed at step S34; one write operation is performed on the current logical block, and a second write operation is performed on the new logical block.

Figure 8:
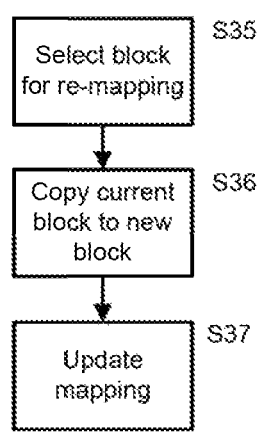
FIG. 8 is a flowchart showing alternative processing carried out to perform a re-mapping operation.

In embodiments in which the processing of FIG. 7 is used, a copy operation between a current logical block and a new logical block may proceed as shown in the flowchart of FIG. 8. At a step S35, a virtual block to be re-mapped is selected, as discussed above, together with a new logical block to which the selected virtual block is to be mapped. An indication is stored that the virtual block is currently subject to a mapping operation (which indication may be used, for example, at step S32 of FIG. 7). At step S36 the logical block to which the virtual block is currently mapped is copied to the new logical block. At step S37 the mapping is updated such that the virtual block is mapped to the new logical block and the indication that the virtual block is currently subject to a re-mapping process is cleared.

Figure 9:
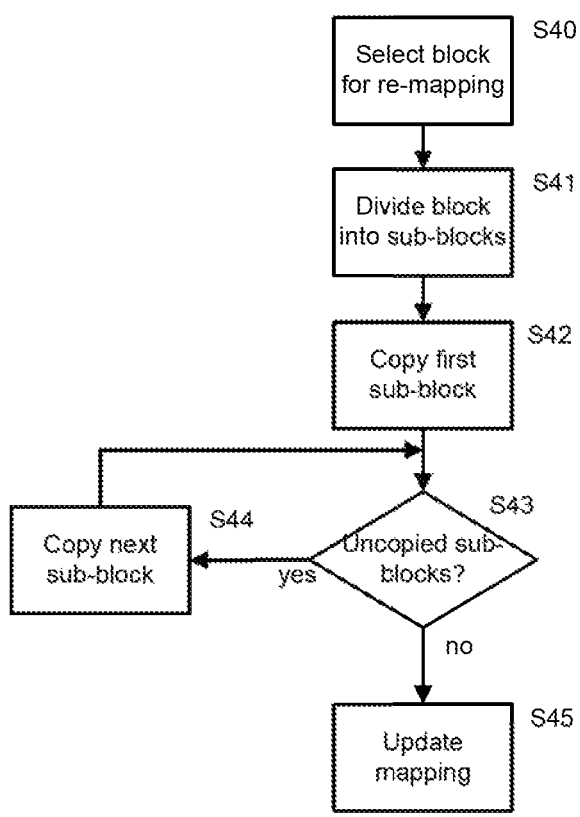
FIG. 9 is a flowchart showing alternative processing carried out to perform a re-mapping operation.

In order to reduce the amount of data which is written to both the new logical block and the current logical block alternative processing may be performed in some embodiments. In particular, the logical blocks may be divided into a plurality of sub-blocks as described above with reference to the processing of FIG. 6. In this way, it is possible to duplicate only those write operations that affect sub-blocks which have already been copied by the re-mapping operation. An example re-mapping process is shown in FIG. 9. At step S40, a virtual block to be re-mapped is selected, as discussed above, together with a new logical block to which the selected virtual block is to be mapped. An indication is stored that the virtual block is currently subject to a re-mapping operation. At step S41 the logical block to which the virtual block is currently mapped is divided into a plurality of sub-blocks. At step S42 the first sub-block of the plurality of sub-blocks is copied to the new logical block and an indication that the sub-block has been copied is stored. At step S43 it is determined whether any of the plurality of the sub-blocks remain to be copied to the new logical block. If it is determined at step S43 that there are un-copied sub-blocks, processing passes to step S44 at which the next un-copied sub-block is copied to the new logical block and an indication that the sub-block has been copied is stored. Processing passes from step S44 to step S43. Processing therefore loops between steps S44 and S43 until each sub-block has been copied to the new logical block.

Figure 10:
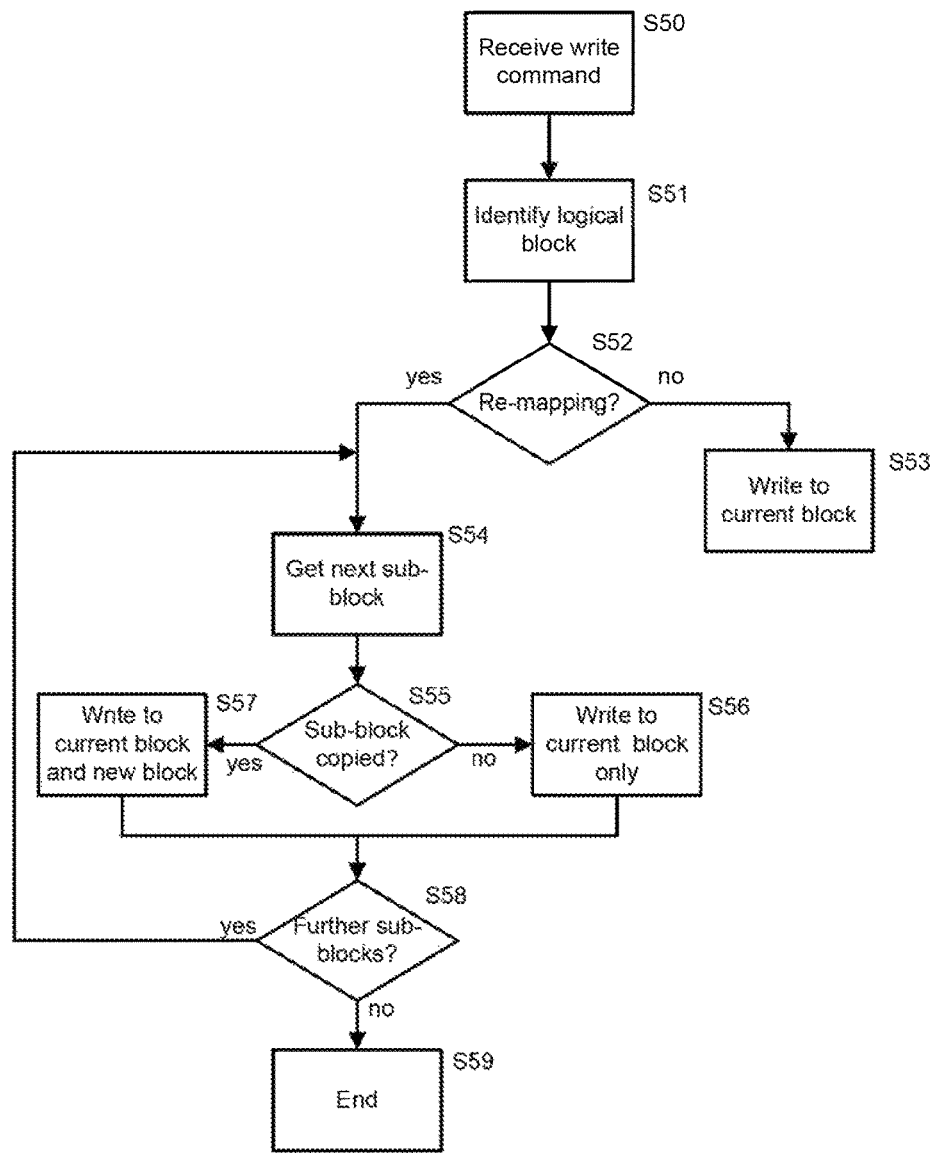
FIG. 10 is a flowchart showing alternative processing carried out to perform a write operation.

If it is determined at step S43 that no un-copied sub-blocks remain, processing passes from step S43 to step S45 at which the mapping is updated such that the virtual block is mapped to the new logical block and the indication that the virtual block is currently subject to a re-mapping process is cleared. In this way, an indication of which sub-blocks have been copied is provided throughout the re-mapping operation. A write operation may therefore proceed as shown in FIG. 10.

At step S50 a write request is received comprising data and an indication of a virtual block to which the data is to be written. At step S51, the current logical block to which the virtual block is mapped is identified. At step S52 it is determined whether the virtual block identified in the write request and the corresponding logical block are subject to a re-mapping operation. If it is determined that there is no re-mapping operation currently active for the virtual block/logical block, processing passes to step S53 and the data is written to the current logical block. If, on the other hand, it is determined at step S52 that the virtual block/logical block are the subject of a current re-mapping operation, processing passes to step S54 at which the next sub-block to which data is to be written as part of the write operation is obtained for processing. Processing passes to step S55 at which it is determined whether the current sub-block has yet to be copied to the new logical block (based on the indications stored at steps S42 and S44 of FIG. 9). If it is determined that the current sub-block has not yet been copied, processing passes to step S56 at which the data for that sub-block is written to the current logical block only. If, on the other hand, it is determined at step S55 that the current sub-block has already been copied, processing passes to step S57 at which the data is written to the correct sub-block of both the current logical block and the new logical block.

Processing passes from each of steps S56 and S57 to step S58 at which it is determined whether there are further sub-blocks to which data is to be written. If it is determined that there are further sub-blocks to which data is to be written, processing passes to step S54. If it is determined at step S58 that there are no further sub-blocks to which data is to be written, the write operation ends at step S59. In this way, the current logical block always contains a complete and up-to-date copy of the data that has been written to the virtual block. As such, if the re-mapping operation fails, at any stage, the current logical block will remain valid.

Alternative processing to reduce the number of write operations that are performed on both the current and new logical blocks may be performed in some embodiments. In particular, the logical blocks may be sub-divided into a plurality of sub-blocks as described above. During a re-mapping process, indications may be stored for each sub-block to indicate whether it has yet been copied to the new logical block. For write requests received during a re-mapping process, writes to already copied sub-blocks may be written only to the new logical block, while writes to as yet un-copied sub-blocks may be written to the current logical block.

The processing described above and with reference to FIGS. 5 to 10, provides examples of the way in which a copy operation may be performed to allow virtual blocks to be re-mapped from one logical block to another logical block, which in turn allows a desired wear-management policy to be implemented. It will be appreciated that other ways to copy data from one logical block to another logical block may be used with other embodiments.

Figure 11:
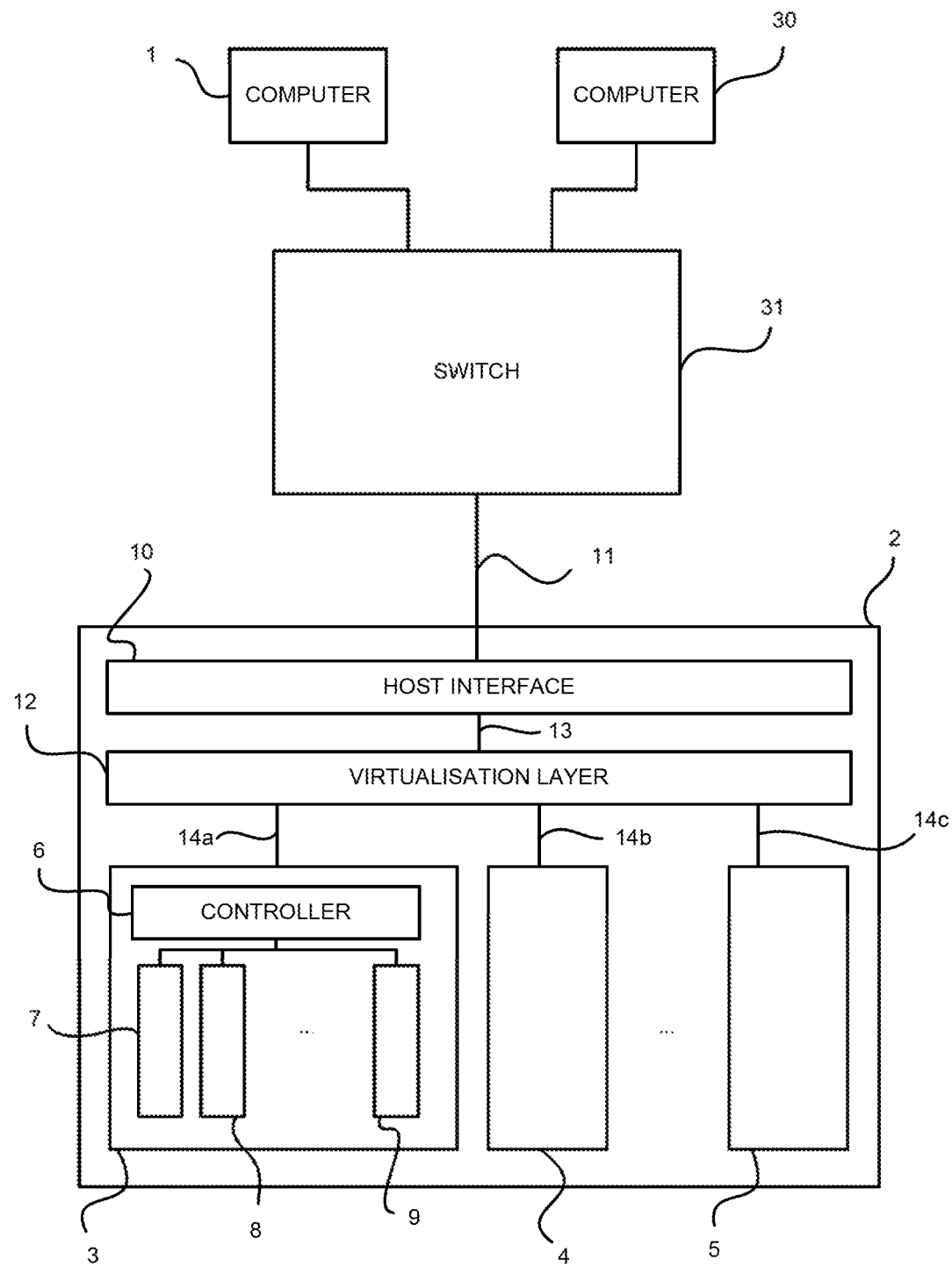
FIGS. 11, 12, 13 are schematic illustrations showing alternative ways in which computers can connect to storage devices.

As described above, FIG. 1 schematically illustrates one way in which a computer can access memory storage. In other embodiments, memory storage may be accessed over a network. For example, FIG. 11 schematically illustrates an embodiment in which two computers, the computer 1 and a further computer 30, access the appliance 2 via a switch 31. The switch 31 is a PCI Express switch, although it will be appreciated that in other embodiments other switches may be used, such as, for example, an Ethernet switch.

Figure 12:
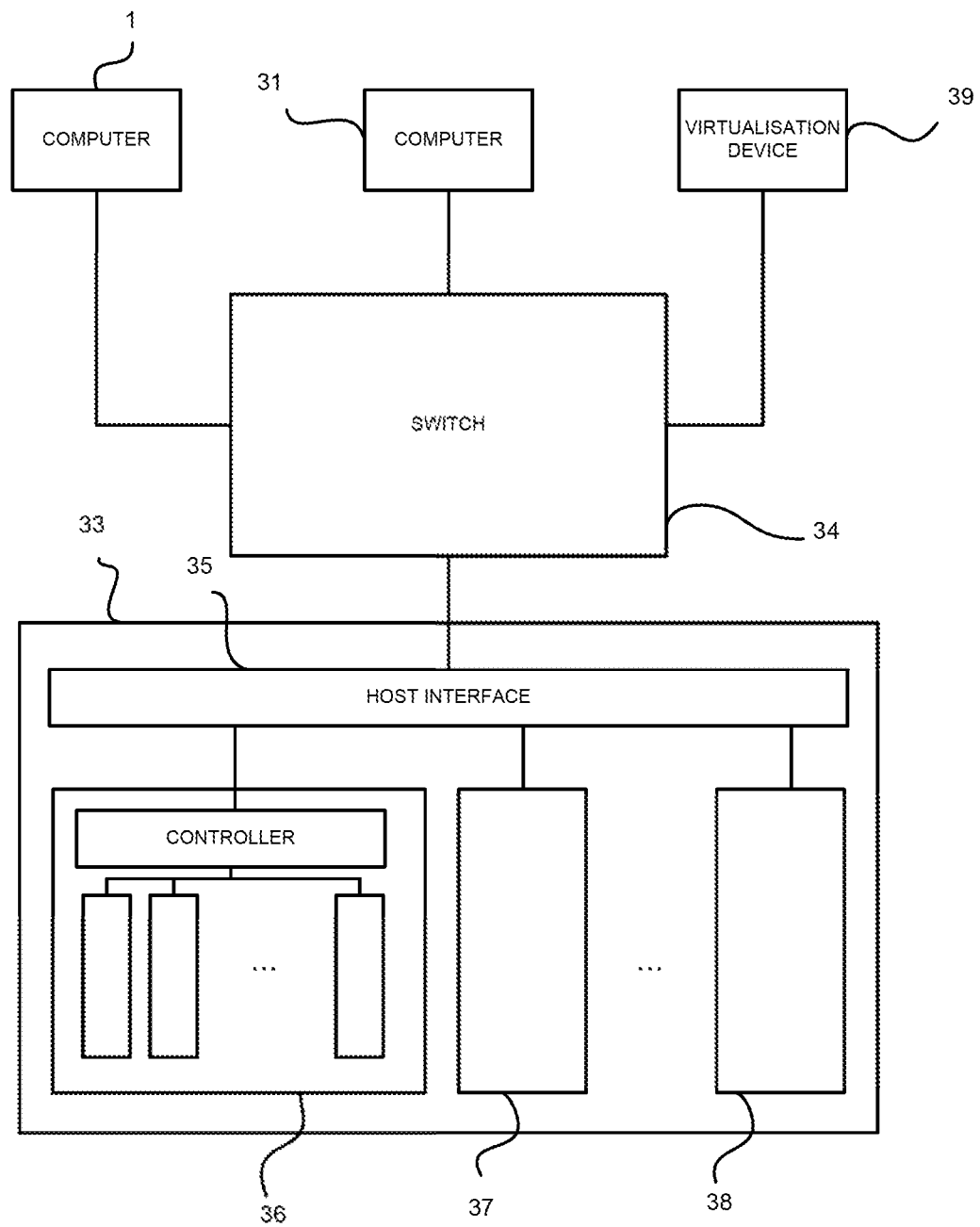

FIG. 12 illustrates an embodiment which provides for distribution of processing to provide a storage appliance capable of implementing an appliance level wear policy. In FIG. 12, the computers 1, 31 connect to an appliance 33 through a switch 34. The appliance 33 is arranged similarly to the appliance 2 with the exception that the appliance 33 does not comprise a virtualisation layer. The appliance 33 comprises a host interface 35 and three SSDs 36, 37, 38. Each SSD 36, 37, 38 is arranged similarly to the SSDs 3, 4, 5 of the appliance 2.

A device 39 is also connected to the switch 34. The device 39 is adapted to perform the processing that is described above as being performed by the virtualisation layer 12. That is, the device 39 is configured to receive an indication of the logical disks provided by the SSDs 36, 37, 38 and to provide one or more virtual disks for use by the computers 1, 31, by creating a mapping between a logical address space and a virtual address space as described above. The device 39 is further configured to re-map blocks of virtual disks from one logical block to another logical block as is described above.

Data packets sent between the computers 1, 31 and the appliance 33 are re-directed to the device 39 for appropriate processing. Re-direction of data packets to the device 39 may be performed in any way. For example, the switch 34 may comprise logic configured to identify data packets that are to be sent between the computers 1, 31 and the appliance 33, and to redirect those data packets to the device 39. Alternatively, an interception device may be provided between the computer 1 and the switch 34. The intercepting device may be configured to intercept data packets sent from the computer 1, identify whether that data packet is intended to be sent to the appliance 33, and if so to modify that data packet so that it is directed to device 39 by the switch 34. Similarly, a corresponding intercepting device may be provided between the appliance 33 and the switch 34 to identify data packets sent from the appliance 33 destined to the computer 1, 31 and to re-direct such data packets to the switch 34. Alternatively, the computers 1, 31 and/or the appliance 33 may be configured to direct data packets to the device 39. For example, a communication interface driver of the computers 1, 31 and/or the appliance 33 may be adapted to cause appropriate data packets to be directed to the device 39.

Upon receipt of data packets, the device 39 performs processing, examples of which are described above, to map, and re-map, virtual disks to logical disks and to copy the contents stored at one logical block to another logical block. In this way, a "logical appliance" is defined by the functionality provided by the appliance 33 and the device 39. In this way, processing of the type described above to implement an appliance-level wear policy may be used even where an appliance is not configured to provide such functionality.

Figure 13:
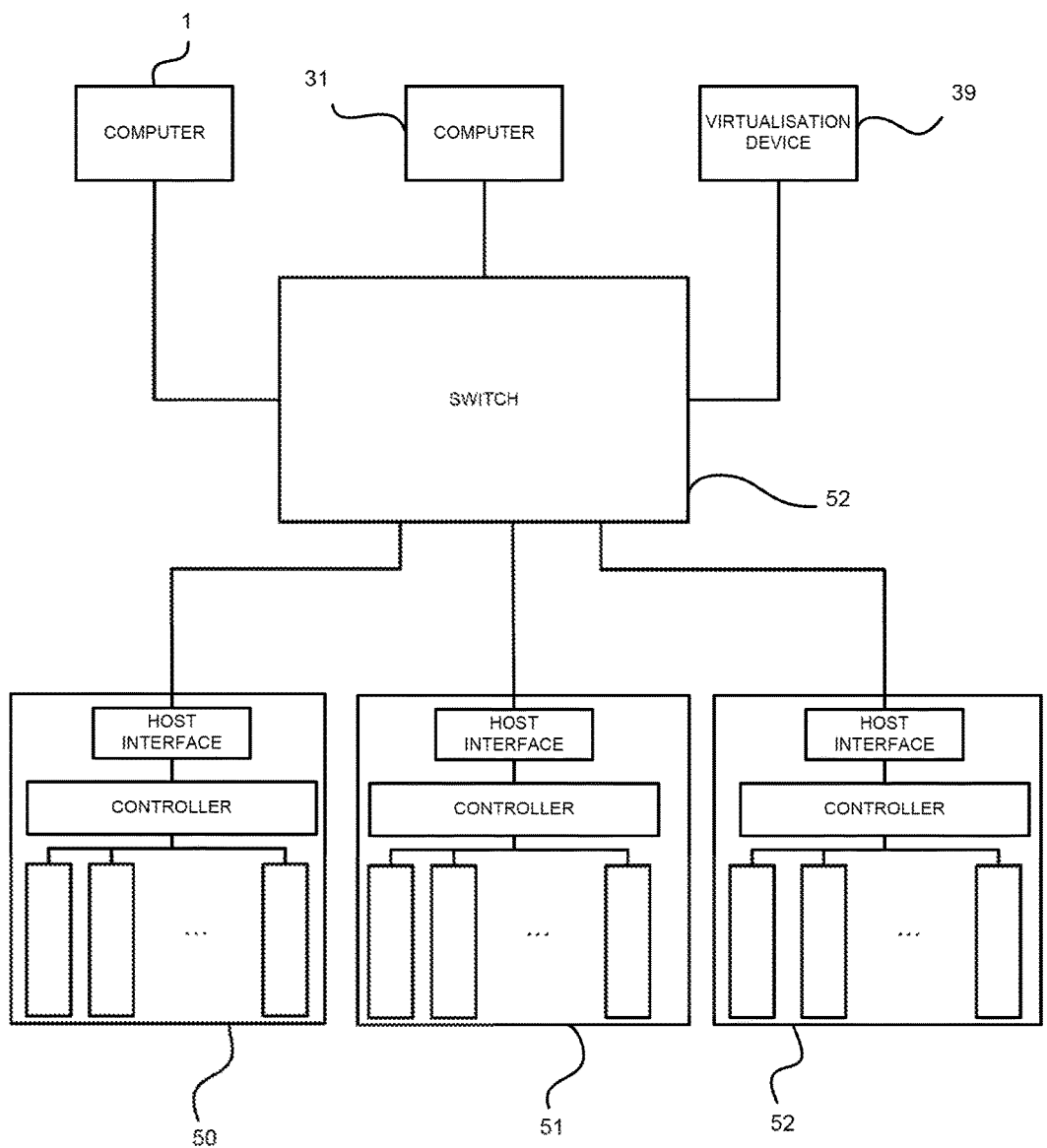

In addition to the arrangements shown in FIGS. 11 and 12, it is to be understood that other arrangements are possible. For example, FIG. 13 illustrates an arrangement in which a logical appliance is provided by three SSD drives 50, 51, 52 and the device 39, each connected to a switch 53. In this way, a logical appliance may be defined which is able to implement an appliance level wear policy, the logical appliance comprising combination of storage devices, without limitation with respect to the storage devices that can be contained within a single component such as the appliance 2 of FIG. 1.

The device 39 may be implemented in hardware, software or a combination of both. Additionally, while shown as a single device, the device 39 may comprise a plurality of devices. For example, some tasks may be implemented in hardware such as an FPGA, while other tasks may be implemented in software operating on a different component of the device 39. In more detail, in some embodiments, mapping tables between logical blocks and virtual blocks and/or between virtual sub-blocks and logical sub-blocks, together with the "dirty bits" where used, may be implemented in an FPGA. In this way, the mapping tables may be updated quickly. Decisions as to which virtual blocks should be mapped to which logical blocks may be performed by software and the outcomes of those decisions passed to the FPGA to be enacted.

Other processing that may be performed by the devices such as the device 39, and ways in which data may be transmitted to the device 39 are described in U.S. patent application Ser. No. 13/923,292, U.S. patent application Ser. No. 12/430,480, United States Patent Publication No. US 2009/0307388, United States Patent Publication No. US 2011/0069710, and United States Patent Publication No. US 2010/0146160.

In other alternative embodiments, some or all of the processing of the virtualisation layer 12 may be performed by one or both of the computers 1, 31 rather than by a virtualisation layer within an appliance or by dedicated devices such as a device. For example, it is described above that the virtualisation layer 12, or the device 39, determines which of the plurality of virtual blocks are high-wear blocks. In some embodiments, the identification of high-wear blocks may be performed at each respective computer. For example, interface driver software within each computer 1, 31 is aware of which of the blocks to which it has access (i.e. the virtual blocks of the virtual disks to which it is provided access) and to which of those blocks it writes the largest quantities of data, writes to most frequently, the size of the write operations, etc. As such, each computer 1, 31 may be arranged to determine which of the blocks to which it has access are high-wear blocks, and to provide indications of high-wear blocks to the virtualisation layer 12, or the device 39.

In this way, additional speed benefits may be obtained through distribution of processing. Further, there may be a large number of virtual blocks within the virtual storage space 21 such that the amount of data that is required to be stored in order to identify high-wear blocks may be substantial. By performing identification of high-wear blocks at the computers 1, 31, the storage requirements for this data may be distributed. Further, resources already provided by the computers 1, 31 may be utilised, obviating the need to provide additional resources in an appliance or a virtualisation controller.

As an additional example of distribution of the processing performed by the virtualisation layer 12, splitting of read/write requests that indicate an address range in the virtual address space 21 spanning multiple virtual blocks may be performed at one or both of the computers 1, 31. That is, as described above, a read/write request may comprise a sequential, contiguous block of addresses that span a plurality of virtual blocks.

Splitting the read/write requests at the entities at which those read/write requests are generated (e.g. the computers 1, 31) allows resources already provided by the computers 1, 31 to be utilised effectively, thereby obviating the need to provide additional processing means at other components (e.g. the appliance 2 of FIG. 1, or the device 39 of FIG. 12).

In light of the teaching above, it will be appreciated that the boundaries of, and the physical arrangement of components that make up the appliance (or "logical appliance") are flexible such that any physical arrangement may be used with embodiments described herein. Functionality described above as being performed by the virtualisation layer 12 may be distributed amongst one or more devices connected to storage devices over a network. That is, the processing described as being provided by the virtualisation layer 12 of FIG. 1 may be provided by a single device (such as the appliance 2 alone, or the device 39 alone, or one or more of the computers 1, 31). Alternatively, aspects of the virtualisation layer 12 may be provided by a plurality of devices connected via a switch.

Three examples of processing that may be used to copy one logical block to another logical block in order to implement a wear policy are described above with reference to FIGS. 5 to 10. The processing described with reference to FIGS. 5 to 10 may, however, be used for reasons other than the implementation of a wear policy. For example, with reference to FIG. 1, the appliance 2 may support the removal of one or more of the SSDs 3, 5, 6 without shutting down the appliance (i.e. "hot-swapping"). Such removal of an SSD may be used, for example, to allow a worn out SSD to be replaced. When an SSD is ready to be replaced, the data contained on that SSD may be copied to blocks on one or more of the other SSDs. For example, if the SSD 3 were to be removed, the data stored on the SSD 3 may be copied to logical blocks of logical disks provided by either or both of the SSDs 4, 5. Similarly, after replacement of the SSD 3 with a new SSD, the data copied to the SSDs 4, 5 may then be copied to the newly installed SSD.

Similarly with reference to FIG. 13. SSDs within the logical appliance may be removed and replaced with other SSDs. The device 39 may utilise block copy operations such as those described above with reference to FIGS. 5 to 10 to copy data from an SSD to be replaced, to one or more existing SSDs.

The block copy operations described above may also be used to copy data that has been copied to one or more existing SSDs to an SSD newly added to an appliance (or logical appliance). It will be appreciated that more than one block copy operation may need to be performed to copy all data stored on an SSD, and that each block copy operation may copy data to logical blocks on different SSDs. For example, with reference to FIG. 1, if the SSD 3 was to be removed from the appliance 2, some data stored on the logical disk LD0 (provided by the SSD 3) may be copied to the logical disk LD1 (provided by the SSD 4) while other data may be copied to the logical disk LD2 (provided by the SSD 5).

In addition to use for implementation of a wear policy, therefore, the block-copy operations described above may also be used to provide a copy mechanism to allow hot-swapping of SSDs from an appliance or logical appliance. It will further be appreciated that the block copy operations described above may be used for storage devices other than solid state memories and SSDs.

Mappings between virtual blocks and logical blocks may also be selected and managed so as to optimize characteristics other than endurance characteristics, in accordance with the embodiments described above. Indeed, it will be appreciated that mappings between virtual blocks and logical blocks may be selected to optimize any desired characteristic.

As a further example only, mappings may be created in order to provide virtual disks with desired latency characteristics. For example, where SSDs within an appliance (or a logical appliance) provide different latencies, it may be desired to provide a virtual disk with a particular latency characteristic. For example, it may be desired to provide at least one low latency virtual disk. The virtual blocks of such a virtual disk (which could be referred to as "low latency virtual blocks") may be mapped to logical blocks provided by those logical disks with the suitably low latencies (which could be referred to as "low latency logical blocks"). As a further example, where each SSD within an appliance (or logical appliance) is of the same type, one or more of the logical disks may be mapped to virtual disks used by particular applications (or by a single application). By restricting the ability of other applications to use logical disks through the mapping between virtual disks and logical disks, the performance of some applications can be improved.

A further example of a characteristic that may be optimized through the choice of mapping between logical disks and virtual disks is that of resilience. For example, mappings may be selected so as to provide a "mirror pair" of virtual disks, each virtual disk within the mirror pair being located on physically distinct SSDs. Alternatively, a virtual disk may be mapped to a first logical disk, In this way, the possibility of data loss as a result of failure of one of those SSDs is mitigated.

While specific embodiments have been described above, it will be appreciated that the invention may be practiced otherwise than as described. The descriptions above are intended to be illustrative, not limiting. Thus it will be apparent to one skilled in the art that modifications may be made to the embodiments described without departing from the scope of the claims that follow.

In conclusion, there are now described a number of possible aspects.

According to a first aspect, there is provided method of managing a plurality of storage devices. The method comprises, at a first device connected to the plurality of storage devices via a switch: receiving via the switch an indication of a plurality of logical disks, each logical disk being provided by a respective one of the plurality of storage devices, each logical disk comprising a plurality of logical blocks; generating a representation of a virtual disk, the virtual disk comprising a plurality of virtual blocks, each virtual block being provided by a logical block; providing to a second device different to the first device via the switch access to the virtual disk; selecting a first virtual block, the first virtual block being provided by a first logical block; and performing a re-mapping operation after which the first virtual block is provided by a second logical block different to the first logical block. In this way, the first aspect provides a method of managing a plurality of storage devices over a network.

Selecting a first virtual block may comprise determining a high-wear virtual block.

The method may further comprise selecting the second logical block so as to level wear across the plurality of storage devices.

The method may further comprise selecting the second logical block so as to concentrate wear on a particular one of the plurality of storage devices. The particular one of the plurality of storages may have a greater endurance than at least one other of the plurality of storage devices.

The first virtual block may be part of a first virtual disk having a first latency characteristic. The method may further comprise selecting the second logical block based on the latency characteristic of the first virtual disk.

The method may further comprise selecting the second logical block from a plurality of low latency logical blocks.

Performing a re-mapping operation may comprise copying the first logical block to the second logical block.

Performing a re-mapping operation may further comprise dividing the first and second logical blocks into a plurality of sub-blocks and copying each sub-block of the first logical block to a sub-block of the second logical block.

The method may further comprise receiving during the re-mapping operation a first write request indicating data to be written to the first virtual block; performing a write operation, the write operation comprising writing the data to the first logical block; marking as dirty each sub-block of the first logical block affected by the write operation; and performing at least one re-copy operation, each re-copy operation copying one of the sub-blocks of the first logical block marked as dirty to a sub-block of the second logical block.

The method may further comprise determining whether a predetermined number of re-copy operations has been performed and if it is determined that a predetermined number of re-copy operations has not been performed, performing at least one further re-copy operation.

The method may further comprise, if it is determined that the predetermined number of re-copy operations has been performed, aborting the re-mapping operation.

The method may further comprise, if it is determined that the predetermined number of re-copy operations has been performed: determining whether a total number of remaining sub-blocks marked as dirty is below a predetermined threshold; and if it is determined that the total number of remaining sub-blocks marked as dirty is below the predetermined threshold temporarily preventing further write operations writing data to the first logical block.

Further write operations may be prevented for a time required to perform re-copy operations for each of the remaining sub-blocks marked as dirty.

If it is determined that the predetermined number of re-copy operations has been performed the method may further comprise determining whether a total number of remaining sub-blocks marked as dirty is below a predetermined threshold; and if it is determined that the total number of remaining sub-blocks marked as dirty is not below the predetermined threshold increasing a rate at which the re-copy operations are performed or increasing the predetermined number of re-copy operations.

The predetermined number of re-copy operations may be increased if it is determined that the number of remaining sub-blocks marked as dirty is below a second predetermined threshold.

The method may further comprise: receiving during the re-mapping operation a second write request indicating second data to be written to the first virtual block; performing a first write operation, the first write operation comprising writing the second data to the first logical block; and performing a second write operation, the second write operation comprising writing the second data to the second logical block.

The method may further comprise receiving from the second device an indication of at least one high-wear virtual block; and wherein selecting a first virtual block comprises selecting a virtual block from the virtual blocks indicated in the indication received from the second device.

Data stored by the first logical block may also be stored by a third logical block, and the second logical block may be selected from a logical disk provided by one of said plurality of storage devices different to the one of said plurality of storage devices that provides the logical disk comprising the third logical block.

According to a second aspect, there is provided a storage system. The storage system comprises a first device, a second device and a plurality of storage devices each storage device being arranged to provide a respective logical disk, each logical disk comprising a plurality of logical blocks. The first device, the second device and the plurality of storage devices are connected to a switching device. The first device stores computer readable instructions arranged to cause the first device to: generate data representing a virtual disk, the virtual disk comprising a plurality of virtual blocks, each virtual block being provided by a logical block; provide access to the virtual disk to the second device; select a first virtual block, the first virtual block being provided by a first logical block; and perform a re-mapping operation after which the first virtual block is provided by a second logical block different to the first logical block.

According to a third aspect, there is provided a method of copying data from a first block provided by a first storage device to a second block provided by a second storage device. The method comprises dividing the first and second blocks into an equal number of sub-blocks; performing a first copy operation, the first copy operation comprising copying each sub-block of the first block to a sub-block of the second block; receiving during the first copy operation a first write request indicating data to be written to the first block; and performing a first write operation, the first write operation writing the first data to the first block.

The method may further comprise marking as dirty each sub-block of the first block affected by the write operation; and performing at least one re-copy operation, each re-copy operation copying one of the sub-blocks of the first block marked as dirty to a sub-block of the second block.

The method may further comprise determining whether a predetermined number of re-copy operations has been performed; and if it is determined that a predetermined number of re-copy operations has not been performed, performing at least one further re-copy operation.

The method may further comprise, if it is determined that the predetermined number of re-copy operations has been performed, aborting the first copy operation.

The method may further comprise, if it is determined that the predetermined number of re-copy operations has been performed, determining whether a total number of remaining sub-blocks marked as dirty is below a predetermined threshold; and if it is determined that the total number of remaining sub-blocks marked as dirty is below the predetermined threshold temporarily preventing further write operations writing data to the first block.

Further write operations may be prevented for a duration of time required to perform re-copy operations for each of the remaining sub-blocks marked as dirty.

The method may further comprise, if it is determined that the predetermined number of re-copy operations has been performed, determining whether a total number of remaining sub-blocks marked as dirty is below a predetermined threshold; and if it is determined that the total number of remaining sub-blocks marked as dirty is not below the predetermined threshold increasing a rate at which the re-copy operations are performed or increasing the predetermined number of re-copy operations.

The predetermined number of re-copy operations may be increased if it is determined that the total number of remaining sub-blocks marked as dirty is below a second predetermined threshold.

The method may further comprise performing a second write operation, the second write operation comprising writing the first data to the second storage area.

According to a fourth aspect, there is provided a storage system. The storage system comprises a first device, a second device, a first storage device providing a first block and a second storage device providing a second block. The first device, the second device, the first storage device and the second storage device are connected to a switch. The first device stores computer readable instructions arranged to cause the first device to perform a copy operation comprising: dividing the first and second blocks into an equal number of sub-blocks; copying each sub-block of the first block to a sub-block of the second block; and wherein the computer readable instructions are further arranged to cause the first device to: receive through the switch from the second device during the copy operation a first write request indicating first data to be written to the first block; and perform a first write operation, the first write operation comprising writing the first data to the first block.

The computer readable instructions may be arranged to cause the first device to mark as dirty each sub-block of the first block affected by the write operation; and to perform at least one re-copy operation, each re-copy operation copying one of the sub-blocks of the first block marked as dirty to a sub-block of the second block.

The computer readable instructions may be arranged to cause the first device to perform a second write operation, the second write operation comprising writing the second data to the second storage area.

According to a fifth aspect, there is provided a method of removing a storage device from a storage system comprising a plurality of storage devices, each storage device providing at least one block. The method comprises: receiving an indication that a first storage device of the plurality of storage devices is to be removed, the first storage device providing a first block; selecting a second storage device, the second storage device providing a second block; dividing the first and second blocks into a plurality of sub-blocks; performing a first copy operation, the first copy operation comprising copying each sub-block of the first block to a sub-block of the second block; receiving during the first copy operation a first write request indicating first data to be written to the first block; and performing a first write operation, the first write operation to write the first data to the first block.

The method may further comprise marking as dirty each sub-block of the first block affected by the first write operation; and performing at least one re-copy operation, each re-copy operation copying one of the sub-blocks of the first block marked as dirty to a sub-block of the second block.

The method may further comprise performing a second write operation, the second write operation comprising writing the first data to the second block.

The method may further comprise: receiving an indication that a third storage device has been added to the storage system, the third storage device providing a third block; dividing the second and third blocks into a plurality of sub-blocks; and performing a second copy operation, the second copy operation comprising copying each sub-block of the second block to a sub-block of the third block.

The method may further comprise: receiving during the second copy operation a second write request indicating second data to be written to the second block; and performing a third write operation, the third write operation comprising writing the second data to the second block.

The method may further comprise marking as dirty each sub-block of the second block affected by the third write operation; and performing at least one re-copy operation, each re-copy operation copying one of the sub-blocks of the second block marked as dirty to a sub-block of the third block.

The method may further comprise performing a fourth write operation, the fourth write operation comprising writing the second data to the third block.

According to a sixth aspect, there is provided a method of copying data from a first block provided by a first storage device to a second block provided by a second storage device, the method comprising receiving during the first copy operation a first write request indicating data to be written to the first block; and performing a first write operation, the first write operation writing the first data to the first block; and performing a second write operation, the second write operation comprising writing the first data to the second storage area.

According to a seventh aspect, there is provided a non-transitory computer readable medium carrying computer readable instructions configured to cause a computer to: receive via a switch an indication of a plurality of logical disks, each logical disk being provided by a respective one of a plurality of storage devices, each logical disk comprising a plurality of logical blocks; generate a representation of a virtual disk, the virtual disk comprising a plurality of virtual blocks, each virtual block being provided by a logical block; provide to a second device different to the first device via the switch access to the virtual disk; select a first virtual block, the first virtual block being provided by a first logical block; and perform a re-mapping operation after which the first virtual block is provided by a second logical block different to the first logical block.

It will be appreciated that aspects can be implemented in any convenient way including by way of suitable hardware and/or software. For example, devices arranged to implement embodiments may be created using appropriate hardware components. Alternatively, a programmable device may be programmed to implement embodiments. The invention therefore also provides suitable computer programs for implementing aspects. Such computer programs can be carried on suitable carrier media including tangible carrier media (e.g. hard disks, CD ROMs and so on) and intangible carrier media such as communications signals.

One or more aspects described herein, may be combined with any one or more other aspects described herein, and/or with any one or more features described herein.

The invention claimed is:

1. A method of copying data from a first block provided by a first storage device to a second block provided by a second storage device, the method comprising:
   dividing the first and second blocks into an equal number of sub-blocks;
   performing a first copy operation, the first copy operation comprising copying at least one sub-block of the first block to a sub-block of the second block;
   receiving during the first copy operation a first write request indicating data to be written to the first block;

performing a first write operation, the first write operation writing the first data to the first block, marking as dirty each sub-block of the first block affected by the first write operation;

performing at least one re-copy operation, each re-copy operation copying one of the sub-blocks of the first block marked as dirty to a sub-block of the second block;

determining whether a predetermined number of re-copy operations has been performed;

if it is determined that the predetermined number of re-copy operations has been performed, determining whether a total number of remaining sub-blocks marked as dirty is below a predetermined threshold; and if it is determined that the total number of remaining sub-blocks marked as dirty is below the predetermined threshold, temporarily preventing further write operations writing data to the first block.

2. The method of claim 1, further comprising if it is determined that the predetermined number of re-copy operations has not been performed, performing at least one further re-copy operation.

3. The method of claim 1, wherein if it is determined that the predetermined number of re-copy operations has been performed and that the total number of remaining sub-blocks marked as dirty is not below the predetermined threshold, the method further comprises aborting the first copy operation.

4. The method of claim 1, wherein further write operations are prevented for a duration of time required to perform re-copy operations for each of the remaining sub-blocks marked as dirty.

5. The method of claim 1, wherein if it is determined that the predetermined number of re-copy operations has been performed and that the total number of remaining sub-blocks marked as dirty is not below the predetermined threshold, the method further comprises increasing a rate at which the re-copy operations are performed or increasing the predetermined number of re-copy operations.

6. The method of claim 5, wherein the predetermined number of re-copy operations is increased if it is determined that the total number of remaining sub-blocks marked as dirty is below a second predetermined threshold.

7. The method of claim 1, further comprising performing a second write operation, the second write operation comprising writing the first data to the second block.

8. A storage system comprising a first device, a second device, a first storage device providing a first block and a second storage device providing a second block, the first device, the second device, the first storage device and the second storage device connected to a switch;

wherein the first device stores computer readable instructions arranged to cause the first device to perform a copy operation comprising:

dividing the first and second blocks into an equal number of sub-blocks;

copying at least one sub-block of the first block to a sub-block of the second block; and wherein the computer readable instructions are further arranged to cause the first device to:

receive through the switch from the second device during the copy operation a first write request indicating first data to be written to the first block;

perform a first write operation, the first write operation comprising writing the first data to the first block;

mark as dirty each sub-block of the first block affected by the first write operation;

perform at least one re-copy operation, each re-copy operation copying one of the sub-blocks of the first block marked as dirty to a sub-block of the second block;

determine whether a predetermined number of re-copy operations has been performed;

if it is determined that the predetermined number of re-copy operations has been performed, determine whether a total number of remaining sub-blocks marked as dirty is below a predetermined threshold; and if it is determined that the total number of remaining sub-blocks marked as dirty is below the predetermined threshold, temporarily preventing further write operations writing data to the first block.

9. The storage system of claim 8, wherein the computer readable instructions are arranged to cause the first device to perform a second write operation, the second write operation comprising writing the first data to the second block.

10. A method of removing a storage device from a storage system comprising a plurality of storage devices, each storage device providing at least one block, the method comprising:

receiving an indication that a first storage device of the plurality of storage devices is to be removed, the first storage device providing a first block;

selecting a second storage device, the second storage device providing a second block;

dividing the first and second blocks into a plurality of sub-blocks;

performing a first copy operation, the first copy operation comprising copying at least one sub-block of the first block to a sub-block of the second block;

receiving during the first copy operation a first write request indicating first data to be written to the first block; and performing a first write operation; the first write operation to write the first data to the first block;

marking as dirty each sub-block of the first block affected by the first write operation;

performing at least one re-copy operation, each re-copy operation copying one of the sub-blocks of the first block marked as dirty to a sub-block of the second block;

determining whether a predetermined number of re-copy operations has been performed;

if it is determined that the predetermined number of re-copy operations has been performed, determining whether a total number of remaining sub-blocks marked as dirty is below a predetermined threshold; and if it is determined that the total number of remaining sub-blocks marked as dirty is below the predetermined threshold, temporarily preventing further write operations writing data to the first block.

11. The method of claim 10, further comprising performing a second write operation, the second write operation comprising writing the first data to the second block.

12. The method of claim 10 further comprising:

receiving an indication that a third storage device has been added to the storage system, the r storage device providing a third block;

dividing the second and third blocks into a plurality of sub-blocks; and performing a second copy operation, the second copy operation comprising copying at least one sub-block of the second block to a sub-block of the third block.

13. The method of claim 12, further comprising:
receiving during the second copy operation a second write request indicating second data to be written to the second block; and
performing a third write operation, the third write operation comprising writing the second data to the second block.

14. The method of claim 13, further comprising marking as dirty each sub-block of the second block affected by the third write operation; and
performing at least one re-copy operation, each re-copy operation copying one of the sub-blocks of the second block marked as dirty to a sub-block of the third block.

15. The method of claim 14, further comprising:
performing a fourth write operation, the fourth write operation comprising writing the second data to the third block.

* * * * *

UNITED STATES PATENT AND TRADEMARK OFFICE
CERTIFICATE OF CORRECTION

PATENT NO. : 10,156,990 B2
APPLICATION NO. : 15/873615
DATED : December 18, 2018
INVENTOR(S) : Marek Piekarski Page 1 of 1

It is certified that error appears in the above-identified patent and that said Letters Patent is hereby corrected as shown below:

In the Claims

| | Delete | Insert |
|---|---|---|
| Column 22, Line 40 Claim 10 | "and performing a first write operation;" | -- and performing a first write operation, -- |
| Column 22, Line 64 Claim 11 | "the r storage device providing a third block;" | -- the third storage device providing a third block; -- |

Signed and Sealed this
Twenty-eighth Day of May, 2019

Andrei Iancu
*Director of the United States Patent and Trademark Office*